US012614656B2

(12) United States Patent
Yen et al.

(10) Patent No.: US 12,614,656 B2
(45) Date of Patent: Apr. 28, 2026

(54) INDUCTOR DEVICE

(71) Applicant: Realtek Semiconductor Corporation, Hsinchu (TW)

(72) Inventors: Hsiao-Tsung Yen, Hsinchu (TW); Jon-Jin Chen, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 987 days.

(21) Appl. No.: 17/807,378

(22) Filed: Jun. 16, 2022

(65) Prior Publication Data

US 2023/0298796 A1 Sep. 21, 2023

(30) Foreign Application Priority Data

Mar. 16, 2022 (TW) .................................. 111109691

(51) Int. Cl.
*H01F 27/29* (2006.01)
*H01F 17/00* (2006.01)

(52) U.S. Cl.
CPC ..... *H01F 17/0013* (2013.01); *H01F 17/0006* (2013.01); *H01F 27/29* (2013.01); *H01F 2017/004* (2013.01); *H01F 2017/0073* (2013.01)

(58) Field of Classification Search
CPC .. H01F 17/0013; H01F 17/0006; H01F 27/29; H01F 2017/004; H01F 2017/0073; H01F 27/2804; H01F 2021/125; H01F 21/12
See application file for complete search history.

(56) References Cited

U.S. PATENT DOCUMENTS

| | | | | |
|---|---|---|---|---|
| 10,128,033 B2 | 11/2018 | Yen et al. | | |
| 2012/0154073 A1* | 6/2012 | Lee | H01F 27/363 334/56 |
| 2019/0279809 A1 | 9/2019 | Yen | |
| 2020/0312511 A1* | 10/2020 | Yen | H01F 27/29 |

OTHER PUBLICATIONS

Hsiao-Tsung Yen, "Inductor Device", U.S. Appl. No. 17/406,259, filed Aug. 19, 2021.
Hsiao-Tsung Yen, "Inductor Device", U.S. Appl. No. 17/659,839, filed Apr. 19, 2022.

* cited by examiner

*Primary Examiner* — Tuyen T Nguyen
(74) *Attorney, Agent, or Firm* — CKC & Partners Co., LLC

(57) ABSTRACT

An inductor device includes a first inductor, a switch, and a second inductor. The first inductor includes a first, a second, a third, and a fourth trace. The first trace is disposed at a first area of the inductor device. The second trace is disposed inside the first trace. The third trace is disposed at a second area of the inductor device. The fourth trace is disposed inside the third trace. When the switch is turned off, the first, the second, the third, and the fourth trace form first path. When the switch is turned on, the first, the third, and the fourth trace form second path. The second inductor includes a fifth and a sixth trace. The fifth trace is disposed at the first area of the inductor device. The six trace is disposed at the second area of the inductor device, and coupled to the fifth trace.

19 Claims, 3 Drawing Sheets

INDUCTOR DEVICE

RELATED APPLICATIONS

This application claims priority to Taiwan Patent Application No. 111109691, filed Mar. 16, 2022, the entirety of which is herein incorporated by reference.

BACKGROUND

Field of Invention

The present invention relates to an electrical device, and more particularly, an inductor device.

Description of Related Art

For a wide band circuit design, an inductor having switch is needed, such that the traces inside the inductor can be adjusted by switching the switch, so as to provide the inductor which is applicable for different bandwidths.

However, since the negative effects of the inductor induced by couplings inside the inductor and different designs of the inductor, it is hard to designs the inductor having switch. In addition, the switch inside the inductor has certain resistance, and the certain resistance will make the quality factor (Q value) of the inductor hard to be keep or even make the quality factor (Q value) of the inductor reduce.

In view of the foregoing, problems and disadvantages are associated with existing products that require further improvement. However, those skilled in the art have yet to find a solution.

SUMMARY

An embodiment of the present disclosure is related to an inductor device, and the inductor device includes a first inductor, a switch, and a second inductor. The first inductor includes a first trace, a second trace, a third trace, and a fourth trace. The first trace is disposed in a first area of the inductor device. The second trace is disposed inside the first trace. The third trace is disposed in a second area of the inductor device. The first area is different from the second area. The fourth trace is disposed inside the third trace. When the switch is turned off, the first trace, the second trace, the third trace, and the fourth trace form a first path. When the switch is turned on, the first trace, the third trace, and the fourth trace form a second path. The second inductor includes a fifth trace and a sixth trace. The fifth trace is disposed in the first area of the inductor device. The sixth trace is disposed in the second area of the inductor device, and coupled to the fifth trace.

Therefore, based on the technical content of the present disclosure, the inductor device of the embodiments of the present disclosure can improve the quality factor (Q value). In addition, the inductor device can be changed between a first path and a second path by the switch, but still maintains the quality factor.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

Figure 1:
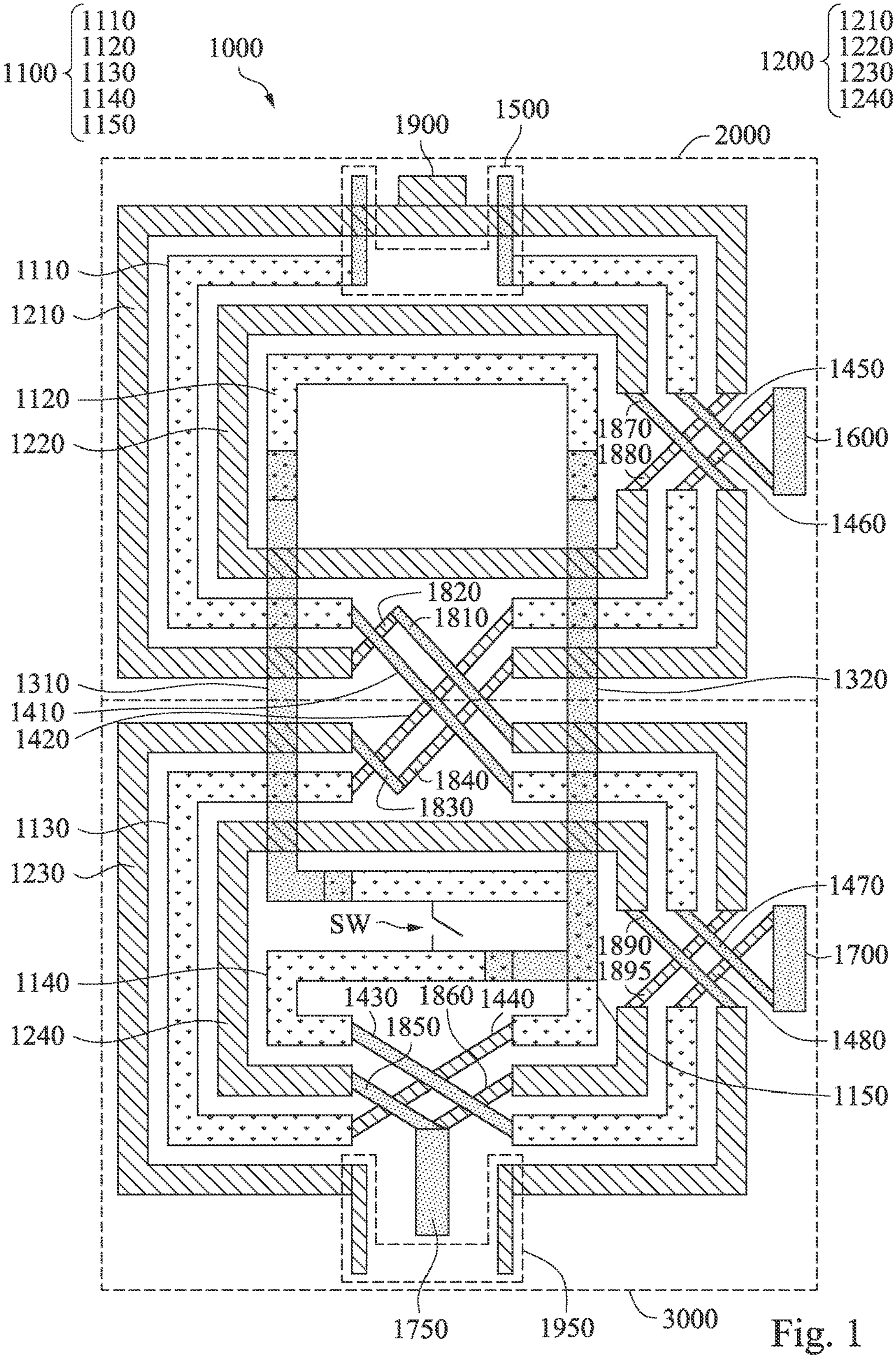
FIG. 1 is a schematic diagram of an inductor device according to one embodiment of the present disclosure.

According to the usual mode of operation, various features and elements in the figures have not been drawn to scale, which are drawn to the best way to present specific features and elements related to the disclosure. In addition, among the different figures, the same or similar element symbols refer to similar elements/components.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a schematic diagram of an inductor device 1000 according to one embodiment of the present disclosure. As shown in the figure, the inductor device 1000 includes a first inductor 1100, a switch SW, and a second inductor 1200. The first inductor 1100 includes a first trace 1110, a second trace 1120, a third trace 1130, and a fourth trace 1140. The second inductor 1200 includes a fifth trace 1210 and a sixth trace 1230.

With respect to the structure, the first trace 1110 is disposed in a first area 2000 of the inductor device 1000. The second trace 1120 is disposed inside the first trace 1110. The third trace 1130 is disposed in a second area 3000 of the inductor device 1000. The first area 2000 is different from the second area 3000. The fourth trace 1140 is disposed inside the third trace 1130. In addition, the fifth trace 1210 is disposed in the first area 2000 of the inductor device 1000. The sixth trace 1230 is disposed in the second area 3000 of the inductor device 1000, and coupled to the fifth trace 1210.

When the switch SW is turned off (in a non-conducting state), the first trace 1110, the second trace 1120, the third trace 1130, and the fourth trace 1140 form a first path. When the switch SW is turned on (in a conducting state), the first trace 1110, the third trace 1130, and the fourth trace 1140 form a second path.

Figure 2:
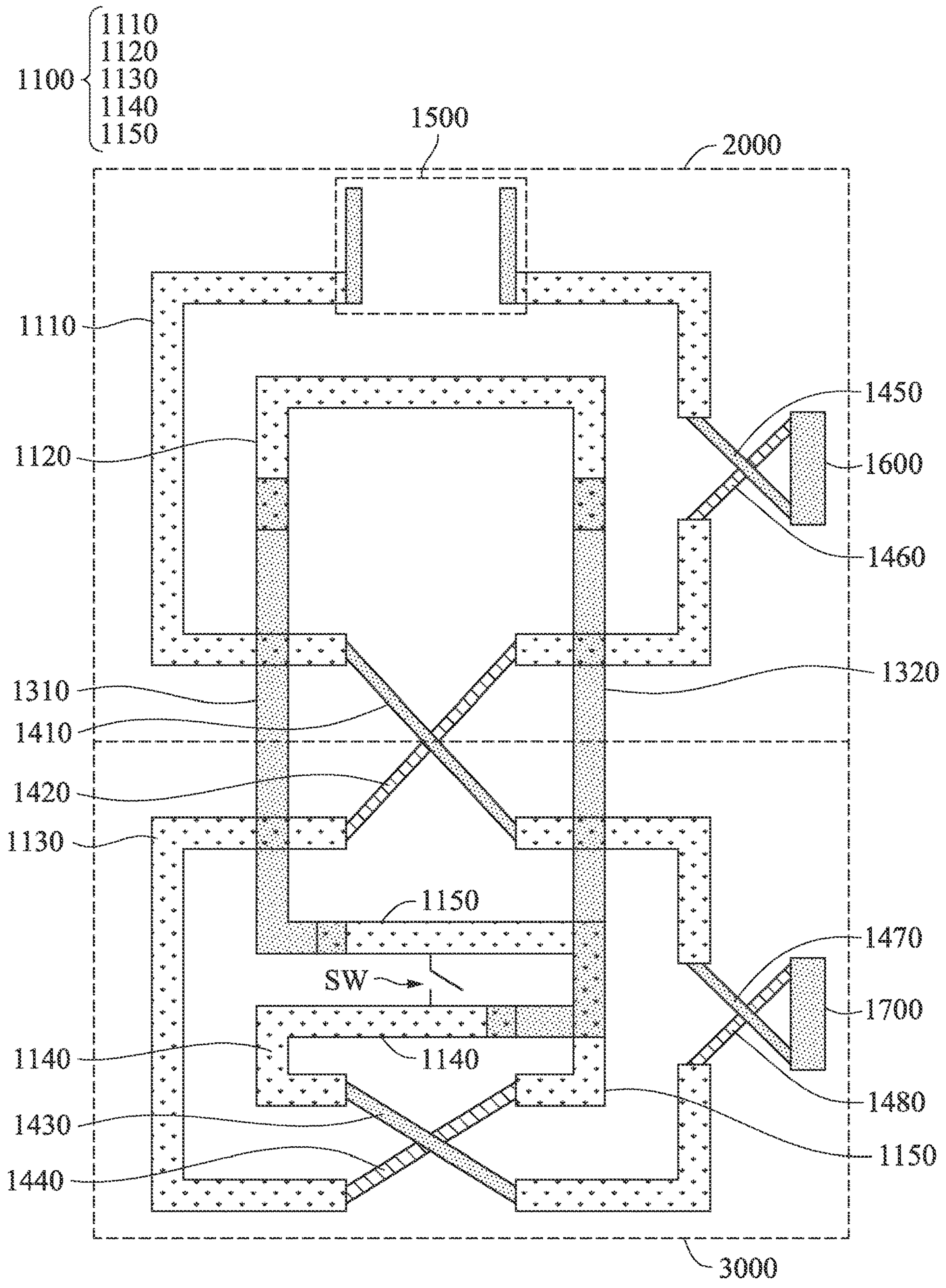
FIG. 2 is a schematic diagram of partial structures of the inductor device shown in FIG. 1 according to one embodiment of the present disclosure.

For facilitating the understanding of the structure of the inductor device 1000 of the embodiment of the present disclosure, please refer to FIG. 2. FIG. 2 is a schematic diagram of partial structures of the inductor device 1000 shown in FIG. 1 according to one embodiment of the present disclosure. As shown in the figure, the first inductor 1100 further includes a seventh trace 1150. The seventh trace 1150 is disposed inside the third trace 1130. In addition, the switch SW is coupled to the fourth trace 1140 and the seventh trace 1150.

When the switch SW is turned off (in a non-conducting state), the first trace 1110, the second trace 1120, the third trace 1130, the fourth trace 1140, and the seventh trace 1150 form the first path. Besides, when the switch SW is turned on (in a conducting state), the first trace 1110, the third trace 1130, and the fourth trace 1140 form the second path.

In some embodiments, the fourth trace 1140 and the seventh trace 1150 are located on a first layer. In another embodiment, the fourth trace 1140 and the seventh trace 1150 are not overlapped with each other.

In some embodiments, the inductor device 1000 further includes a first connection member 1310 and a second connection member 1320. The first connection member 1310 is coupled to the second trace 1120 and the seventh trace 1150. The second connection member 1320 is coupled to the second trace 1120 and the fourth trace 1140. In another embodiment, the first connection member 1310 and the second connection member 1320 are located on a second layer. The first layer is different from the second layer.

In some embodiments, the first connection member 1310 is disposed across the first trace 1110, the second trace 1120, the third trace 1130, the fifth trace 1210, the sixth trace 1230, and the seventh trace 1150. In another embodiment, the second connection member 1320 is disposed across the first trace 1110, the second trace 1120, the third trace 1130, the fourth trace 1140, the fifth trace 1210, the sixth trace 1230, and the seventh trace 1150.

In some embodiments, the inductor device 1000 further includes a first interlaced connection member (e.g., structures 1410, 1420) and a second interlaced connection member (e.g., structures 1430, 1440). The first interlaced connection member (e.g., structures 1410, 1420) is configured to couple the first trace 1110 and the third trace 1130. The second interlaced connection member (e.g., structures 1430, 1440) is configured to couple the third trace 1130, the fourth trace 1140, and the seventh trace 1150. In another embodiment, the first interlaced connection member includes the first interlaced connection element 1410 and the second interlaced connection element 1420. In addition, the second interlaced connection member includes the third interlaced connection element 1430 and the fourth interlaced connection element 1440.

In some embodiments, the inductor device 1000 further includes a third interlaced connection member (e.g., structures 1450, 1460) and a first via 1600. The first via 1600 is coupled to the first trace 1110 together with the third interlaced connection member (e.g., structures 1450, 1460). In another embodiment, the third interlaced connection member includes the fifth interlaced connection element 1450 and the sixth interlaced connection element 1460.

In some embodiments, the inductor device 1000 further includes a fourth interlaced connection member (e.g., structures 1470, 1480) and a second via 1700. The second via 1700 is coupled to the third trace 1130 together with the fourth interlaced connection member (e.g., structures 1470, 1480). In another embodiment, the fourth interlaced connection member includes the seventh interlaced connection element 1470 and the eighth interlaced connection element 1480. In still another embodiment, the third interlaced connection member (e.g., structures 1450, 1460) and the fourth interlaced connection member (e.g., structures 1470, 1480) are located on the same side (e.g., the right side in the figure) of the inductor device 1000. In other words, the fifth interlaced connection element 1450, the sixth interlaced connection element 1460, the seventh interlaced connection element 1470, and the eighth interlaced connection element 1480 are located on the same side (e.g., the right side in the figure) of the inductor device 1000.

In some embodiments, the inductor device 1000 further includes the first input/output terminal 1500. The first input/output terminal 1500 is disposed in the first area 2000 of the inductor device 1000, and coupled to the first trace 1110.

Figure 3:
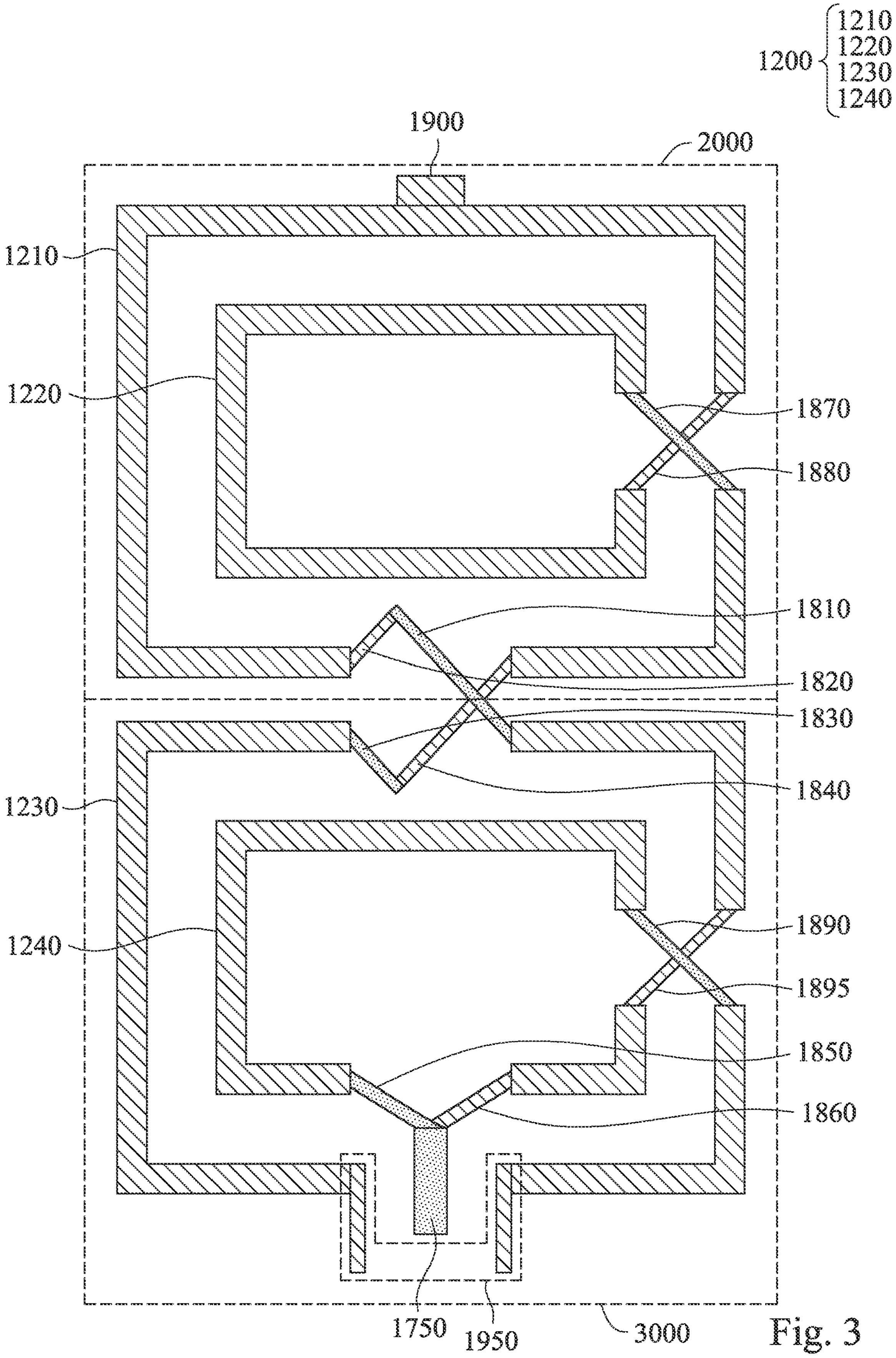
FIG. 3 is a schematic diagram of partial structures of the inductor device shown in FIG. 1 according to one embodiment of the present disclosure.

For facilitating the understanding of the structure of the inductor device 1000 of the embodiment of the present disclosure, please refer to FIG. 3. FIG. 3 is a schematic diagram of partial structures of the inductor device 1000 shown in FIG. 1 according to one embodiment of the present disclosure. As shown in the figure, the second inductor 1200 further includes an eighth trace 1220 and a ninth trace 1240. The eighth trace 1220 is disposed inside the fifth trace 1210. The ninth trace 1240 is disposed inside the sixth trace 1230.

In some embodiments, the inductor device 1000 further includes a fifth interlaced connection member (e.g., structures 1810~1840). The fifth interlaced connection member (e.g., structures 1810~1840) is configured to couple the fifth trace 1210 and the sixth trace 1230, and disposed adjacent to the first interlaced connection member (e.g., structures 1410, 1420) as shown in FIG. 1. In another embodiment, the fifth interlaced connection member includes the ninth interlaced connection element 1810, the tenth interlaced connection element 1820, the eleventh interlaced connection element 1830, and the twelfth interlaced connection element 1840.

In some embodiments, the inductor device 1000 further includes a connection member (e.g., structures 1850, 1860) and a third via 1750. The connection member (e.g., structures 1850, 1860) is disposed adjacent to the second interlaced connection member (e.g., structures 1430, 1440) as shown in FIG. 1. The third via 1750 and the connection member (e.g., structures 1850, 1860) are coupled to the ninth trace 1240 together. In another embodiment, the connection member includes the thirteenth interlaced connection element 1850 and the fourteenth interlaced connection element 1860.

In some embodiments, the inductor device 1000 further includes a sixth interlaced connection member (e.g., structures 1870, 1880) and a seventh interlaced connection member (e.g., structures 1890, 1895). The sixth interlaced connection member (e.g., structures 1870, 1880) is configured to couple the fifth trace 1210 and the eighth trace 1220, and disposed adjacent to the third interlaced connection member (e.g., structures 1450, 1460) as shown in FIG. 1. The seventh interlaced connection member (e.g., structures 1890, 1895) is configured to couple the sixth trace 1230 and the ninth trace 1240, and disposed adjacent to the fourth interlaced connection member (e.g., structures 1470, 1480) as shown in FIG. 1. In another embodiment, the sixth interlaced connection member includes the fifteenth interlaced connection element 1870 and the sixteenth interlaced connection element 1880. In addition, the seventh interlaced connection member includes the seventeenth interlaced connection element 1890 and the eighteenth interlaced connection element 1895.

In some embodiments, the sixth interlaced connection member (e.g., structures 1870, 1880) and the seventh interlaced connection member (e.g., structures 1890, 1895) are located on the same side of the inductor device 1000 (e.g., the right side in the figure). In other words, the fifteenth interlaced connection element 1870, the sixteenth interlaced connection element 1880, the seventeenth interlaced connection element 1890, and the eighteenth interlaced connection element 1895 are located on the same side of the inductor device 1000 (e.g., the right side in the figure).

In some embodiments, the inductor device 1000 further includes a center-tapped terminal 1900. The center-tapped terminal 1900 is disposed in the first area 2000 of the inductor device 1000, and coupled to the fifth trace 1210.

In some embodiments, the inductor device 1000 further includes a second input/output terminal 1950. The second input/output terminal 1950 is disposed in the second area 3000 of the inductor device 1000, and coupled to the sixth trace 1230.

It can be understood from the embodiments of the present disclosure that application of the present disclosure has the following advantages. The inductor device of the embodiments of the present disclosure can improve the quality factor (Q value). In addition, the inductor device can be changed between the first path and the second path by the switch, but still maintains the quality factor.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An inductor device, comprising:
a first inductor, comprising:
a first trace, disposed in a first area of the inductor device;
a second trace, disposed inside the first trace;
a third trace, disposed in a second area of the inductor device, wherein the first area is different from the second area; and
a fourth trace, disposed inside the third trace;
a second inductor, comprising:
a fifth trace, disposed in the first area of the inductor device; and
a sixth trace, disposed in the second area of the inductor device, and coupled to the fifth trace,
wherein the first inductor further comprises:
a seventh trace, disposed inside the third trace; and
a switch coupled to the fourth trace and the seventh trace, wherein when the switch is turned off, the first trace, the second trace, the third trace, the fourth trace, and the seventh trace are coupled together to form a first path, wherein when the switch is turned on, the first trace, the third trace, and the fourth trace are coupled together through the switch to form a second path.

2. The inductor device of claim 1, wherein the fourth trace and the seventh trace are located on a first layer.

3. The inductor device of claim 2, wherein the fourth trace and the seventh trace are not overlapped with each other.

4. The inductor device of claim 3, further comprising:
a first connection member, coupled to the second trace and the seventh trace; and
a second connection member, coupled to the second trace and the fourth trace.

5. The inductor device of claim 4, wherein the first connection member and the second connection member are located on a second layer, wherein the first layer is different from the second layer.

6. The inductor device of claim 5, wherein the first connection member is disposed across the first trace, the second trace, the third trace, the fifth trace, the sixth trace, and the seventh trace.

7. The inductor device of claim 6, wherein the second connection member is disposed across the first trace, the second trace, the third trace, the fourth trace, the fifth trace, the sixth trace, and the seventh trace.

8. The inductor device of claim 4, further comprising:
a first interlaced connection member, configured to couple the first trace and the third trace; and
a second interlaced connection member, configured to couple the third trace, the fourth trace, and the seventh trace.

9. The inductor device of claim 8, further comprising:
a third interlaced connection member; and
a first via, coupled to the first trace together with the third interlaced connection member.

10. The inductor device of claim 9, further comprising:
a fourth interlaced connection member; and
a second via, coupled to the third trace together with the fourth interlaced connection member.

11. The inductor device of claim 10, wherein the third interlaced connection member and the fourth interlaced connection member are located on a same side of the inductor device.

12. The inductor device of claim 11, wherein the second inductor further comprises:
an eighth trace, disposed inside the fifth trace; and
a ninth trace, disposed inside the sixth trace.

13. The inductor device of claim 12, further comprising:
a fifth interlaced connection member, configured to couple the fifth trace and the sixth trace, and disposed adjacent to the first interlaced connection member.

14. The inductor device of claim 13, further comprising:
a connection member, disposed adjacent to the second interlaced connection member; and
a third via, coupled to the ninth trace together with the connection member.

15. The inductor device of claim 14, further comprising:

a sixth interlaced connection member, configured to couple the fifth trace and the eighth trace, and disposed adjacent to the third interlaced connection member; and a seventh interlaced connection member, configured to couple the sixth trace and the ninth trace, and disposed adjacent to the fourth interlaced connection member.

16. The inductor device of claim 15, wherein the sixth interlaced connection member and the seventh interlaced connection member are located on a same side of the inductor device.

17. The inductor device of claim 16, further comprising:

a center-tapped terminal, disposed in the first area of the inductor device, and coupled to the fifth trace.

18. The inductor device of claim 17, further comprising:

a first input/output terminal, disposed in the first area of the inductor device, and coupled to the first trace.

19. The inductor device of claim 18, further comprising:

a second input/output terminal, disposed in the second area of the inductor device, and coupled to the sixth trace.

* * * * *